US008489514B2

(12) United States Patent
Keene

(10) Patent No.: US 8,489,514 B2
(45) Date of Patent: Jul. 16, 2013

(54) METHOD, SYSTEM AND PROGRAM PRODUCT FOR GENERATING A DEMANUFACTURING PRICE QUOTE

(75) Inventor: Robert A. Keene, Endicott, NY (US)

(73) Assignee: International Business Machines Corporation, Armonk, NY (US)

(*) Notice: Subject to any disclaimer, the term of this patent is extended or adjusted under 35 U.S.C. 154(b) by 2426 days.

(21) Appl. No.: 10/329,144

(22) Filed: Dec. 24, 2002

(65) Prior Publication Data

US 2004/0122728 A1 Jun. 24, 2004

(51) Int. Cl.
*G06Q 10/00* (2012.01)

(52) U.S. Cl.
USPC .......................................... 705/308

(58) Field of Classification Search
USPC .......................................... 705/308
See application file for complete search history.

(56) References Cited

U.S. PATENT DOCUMENTS

| | | |
|---|---|---|
| 4,488,463 A | 12/1984 | Pontarella |
| 5,080,291 A | 1/1992 | Bloom |
| 5,111,391 A | 5/1992 | Fields et al. |
| 5,148,969 A | 9/1992 | Boucher et al. |
| 5,168,445 A | 12/1992 | Kawashima et al. |
| 5,424,944 A | 6/1995 | Kelly et al. |
| 5,532,928 A | 7/1996 | Stanczyk et al. |
| 5,699,525 A | 12/1997 | Embutsu et al. |
| 5,802,501 A | 9/1998 | Graff |
| 5,948,137 A | 9/1999 | Pflaum |
| 5,950,936 A | 9/1999 | Bergart |
| 5,965,858 A * | 10/1999 | Suzuki et al. ................. 235/375 |
| 6,192,347 B1 | 2/2001 | Graff |
| 6,226,617 B1 | 5/2001 | Suzuki et al. ..................... 705/1 |
| 6,249,715 B1 | 6/2001 | Yuri et al. |
| 6,305,548 B1 | 10/2001 | Sato et al. ..................... 209/3.3 |
| 6,529,788 B1 | 3/2003 | Tani et al. |
| 6,725,184 B1 | 4/2004 | Gadh et al. |
| 7,054,824 B1 | 5/2006 | Grenchus, Jr. et al. |
| 7,251,611 B2 | 7/2007 | Abbott et al. |
| 7,412,397 B2 | 8/2008 | Grenchus, Jr. et al. |
| 7,877,285 B2 | 1/2011 | Grenchus, Jr. et al. |
| 2002/0002408 A1 | 1/2002 | Kobayaski et al. ............. 700/29 |

(Continued)

FOREIGN PATENT DOCUMENTS

| | | |
|---|---|---|
| JP | 11165160 A | 6/1999 |
| JP | 2001306675 | 11/2001 |

OTHER PUBLICATIONS

Johnson, Michael R., Evaluating Remanufacturing and Demanufacturing for Extended Producer Responsibility & Sustainable Product Management, Windsor, Ontario, Canada, Jan. 2002.*

(Continued)

*Primary Examiner* — Nathan Erb

(74) *Attorney, Agent, or Firm* — Schmeiser, Olsen & Watts, LLP; Lisa Ulrich

(57) ABSTRACT

A method, system, and program product for generating a price quote to demanufacture a lot of electronic equipment is disclosed. Representative equipment groups are defined which include default values, based upon knowledge and experience, and study values, based upon dismantle studies. When a quote is requested to demanufacture a given lot of equipment, the equipment in the lot is categorized into representative equipment groups. As profit/loss is calculated for each equipment group, if study values are available, these are used, otherwise default values are used. Pricing contingency and profit may further be calculated to generate the price quote.

16 Claims, 3 Drawing Sheets

U.S. PATENT DOCUMENTS

| | | | | |
|---|---|---|---|---|
| 2002/0046042 | A1 | 4/2002 | Tamuru et al. | 705/1 |
| 2002/0069137 | A1* | 6/2002 | Hiroshige et al. | 705/27 |
| 2002/0188480 | A1* | 12/2002 | Liebeskind et al. | 705/4 |
| 2004/0181422 | A1* | 9/2004 | Brand | 705/1 |

OTHER PUBLICATIONS

Guy, Bradley, and McLendon, Sean, "How Cost Effective Is Deconstruction?" BioCycle, Jul. 2001, 42, 7, pp. 75-78, 80, and 82.*

Linsen, Mary Ann, "Shoppers Trading Down, But Not Out," Progressive Grocer, Deerfield, Nov. 1991, vol. 70, Iss. 11, p. 83.*

2003 IEEE International Symposium on Electronics and the Environment Life-Cycle Environmental Stewardship for Electronic Products May 19-22, 2003 Boston, MA Authors: Edward Grenchus & Robert Keene.

DiMarco et al, (Compatibility Analysis of Product Design for Recyclability and Reuse, ASMEComputers in Engineering Conference, Feb. 1994.

Ed Grenchus, Robert Keene, Charles Nobs, "Composition and Value of Returned Consumer and Industrial Information Technology Equipment," IBM Endicott Asset Recovery Center, Endicott, NY.

Ed Grenchus, Robert Keene, Robert Luce, Charles Nobs, "Process of Demanufacturing Computer Equipment as Practiced at IBM's Asset Recovery Center." 1998 IE Solutions '98 Conference, May 10-13, 1998. Banff, Canada, pp. 62-67.

Ed Grenchus, Robert Keene, Charles Nobs. "Demanufacturing of Information Technology Equipment" The Demanufacturing of Electronic Equipment Conference Oct. 28-30, 1998, Deerfield Beach, FL, pp. 157-160.

Edward J. Grenchus, "Overview of IBM's Demanufacturing Process," The Demanufacturing of Electronic Equipment Conference, Oct. 1997, Deerfield Beach, Florida.

Ed Grenchus, Robert Keene, Robert Luce, Larry Yehle, "A Pragmatic Approach to Demanufacturing Information Technology Equipment," The Demanufacturing of Electronic Equipment Conference, Oct. 28-30, 1998, Deerfield Beach, Florida.

Ed Grenchus, Shirley Johnson, and Dan McDonnell, "Improving Environmental Performance Through Reverse Logistics at IBM," IEEE International Symposium on Electronics and the Environment, May 7-9, 2001, pp. 236-239.

L Bertagnoli, "Computers Get a Second Change: Businesses Reuse, Recycle, Donate." Crain's Chicago Business, vol. 23, No. 41, Oct. 2, 2000, pp. SR15 and SR17.

Green, L. A., "Recycling—No More Electronics Dumping in Massachusetts," Environmental Health Perspectives, V. 108, No. 9, Sep. 2000, p. A398.

D. Pascovitz, "Recycling: Please Dispose of Properly, Entrepreneurs Look for Ways to Put Old Computers to Good Use," Scientific American, vol. 282, No. 2 Feb. 2000, p. 33.

H. Schuessler, "All Used Up with Someplace to Go." New York Times, Nov. 23, 2000, pp. G1 and G9.

R. Hepp, "Obsolete PCs Spur Trash Talk." Chicago Tribune, Feb. 28, 2000, pp. 4:1-2.

W. E. LeRoy, "Scrap from Electronics Seen 'Skyrocketing'," American Metal Market, vol. 106, No. 197 Oct. 14, 1998, p. 10A.

N. Alster et al., "Are Old PCs Poisoning Us?" Business Week, Issue 3685 Jun. 12, 2000, pp. 78 and 80.

Manbir S Sodhi. and Winston A, Knight, "Models and Tools for End-Of-Life Product Management."The Demanufacturing of Electronic Equipment, Oct. 29-31, 1997, vol. 1, Conference Coordinated by: Florida Educational Seminars, Inc. Boca Raton, Florida, pp. 1-9.

Joseph P. Mahoney, "The Risks and Rewards of Electronics Recycling Needs/Benefits Analysis for OEM's and Electronics Recycling Companies," The Demanufacturing of Electronic Equipment, Oct. 28-30, 1998, vol. 2, Conference Coordinated by Florida Educational Seminars, Inc., Boca Raton, Florida, pp. 1-4.

Ketan Limaye and Reggie J. Caudill, "System Simulation and Modeling of Electronics Demanufacturing Facilities," IEEE International Symposium on Electronics & the Environment, Danvers, Massachusetts, May 11-13, 1999, pp. 238-243.

Sanchoy K. Das and Shibu Matthew, "Characterization of Material Outputs from an Electronics Demanufacturing Facility," IEEE International Symposium on Electronics & the Environment, Danvers, Massachusetts, May 11-13, 1999, pp. 251-256.

Pitipong Veerakamolmal and Surendra M. Gupta, "A Combinatorial Cost-Benefit Analysis Methodology for Designing Modular Electronic Products for the Environment," IEEE International Symposium on Electronics & The Environment, Danvers, Massachusetts, May 11-13, 1999, pp. 268-273.

Burton H. Lee and Kosuke Ishii, "Demanufacturing Complexity Metrics in Design for Recyclability." Department of Mechanical Engineering, Stanford University, Danford, CA 94305-4021, IEEE 1997, pp. 19-24.

Ed Grenchus, Charles Nobs, Larry Yehle, "The Quest for Environmental and Productivity Improvements at the IBM Demanufacturing and Asset Recovery Center," 2001, pp. 25-29.

Peter A. Sandborn and Cynthia F. Murphy, "A Model for Optimizing the Assembly and Disassembly of Electronic Systems," IEEE Transactions on Electronics Packaging Manufacturing, vol. 22, No. 2, Apr. 1999, pp. 105-117.

Peter Sandborn, Assembly/Disassembly Optimization Model (the "salvage" model), Dec. 24, 1999, 3 pages.

Lea McLees, "Rapid Prototyping—Key to Speedy Manufacturing," Aug. 5, 1997, 10 pages.

L. B. Jung, "The Conundrum of Computer Recycling," Resource Recycling Magazine, May 1999, 6 pages.

J. Stackhouse, "Global PC Growth Slips Back," Newsbytes News Network, Dec. 12, 1999, 1 page.

McCall, "Gartner Group's Dataquest Says European Industry Surpasses 23 Percent Growth in Third Quarter," Business Wire, Nov. 5, 1999, 2 pages.

Microsoft Computer Dictionary, 1997, Microsoft Press, Third Edition.

J. Markoff, J., "Compressed Data: The PC Industry Shows Strong Growth," The New York Times, Oct. 25, 1999, Section C, p. 4.

E. Grenchus, R Keene, C. Nobs, "Demanufaturing of Information Technology Equipment", Proc. 1997 IEEE Int. Synp. on Electronics and the Environment, San Francisco, CA, May 1997, pp. 157-160.

E. Grenchus, et al, "Linking Demanufacturing Operations with Product DFE Initiatives, Proc.," IEEE In. Symp. on Electronics and the Environment, Oak Brook, IL, May 4-6, 1998, pp. 270-274.

E. Grenchus, "Computers: Reuse and Recycling," handout presented at Annual Recycling Conf. and Vendor Exposition, Federation of New York Solid Waste Assoc, and other sponsors, Syracuse, NY, Oct. 5 & 6, 1998, 14 pages.

M. Dunnett, et al., "Evaluation of IBM End of Life Products: Measuring DFE Effectiveness," Proc. 1999 IEEE Intl. Symp. on Electronics and the Environment, May 11-13, 1999, pp. 98-103.

C. Boswell, "A Feedback Strategy for a closed loop end-of-life cycle process," IEEE and IEE Intl. Conf. on Clean Electronics Products & Technology, Edinburgh, Scotland, Oct. 9-11, 1995, pp. 142-147.

E. Hirasawa, "A Recycling Plant for Home Electric Appliances," Mitsubishi Electric ADVANCE, Technical Report, Sep. 1999, vol. 87 pp. 7-11, (Japan).

* cited by examiner

METHOD, SYSTEM AND PROGRAM PRODUCT FOR GENERATING A DEMANUFACTURING PRICE QUOTE

CROSS REFERENCES TO RELATED APPLICATIONS

U.S. patent application Ser. No. 09/524,366, entitled "METHOD OF DEMANUFACTURING A PRODUCT" by E. J. Grenchus et al., and Ser. No. 09/923,470, entitled "SYSTEM AND METHOD FOR FORECASTING DEMANUFACTURING REQUIREMENTS" by E. J. Grenchus et al., contain subject matter related, in certain respect, to the subject matter of the present application. The above-identified patent applications are incorporated herein by reference.

FIELD OF THE INVENTION

The present invention generally relates to a method, system, and program product for generating a demanufacturing price quote. Specifically, the present invention allows price quotes to be generated for the processing of end-of-life electronic equipment that is to be dismantled, recycled or otherwise disposed of in an environmentally safe manner.

BACKGROUND OF THE INVENTION

As the life cycle of computers and other complex electronic equipment continues to decrease due to new technology and improved processing performance, the useful life span of equipment has become correspondingly shorter. Processing this equipment and salvaging useful components and materials has become imperative from both an economic and environmental standpoint. As a result, dismantle and salvage, and other demanufacturing enterprises are receiving an increasing volume and diversity of returned end-of-life equipment. These enterprises are faced with the problem of determining the potential value of, and processing expense for, heterogeneous lots of equipment when generating price quotes to process such lots of equipment. Usually, one or two predominant factors, such as commodity market recovery prices or contaminated material content, are taken into consideration by an agent of a demanufacturing enterprise, who may add an intangible factor based upon his or her personal experience to the decision process when generating a price quote. However, in the electronics sector, specifically when dealing with computers and other types of information technology equipment, the variability of the internal content and complexity of items contained within a given lot of equipment makes this type of decision methodology impractical. A quote may be generated at a price that is too low and therefore unprofitable, or even worse, such that an enterprise may lose money on the quote. Alternatively, a quote may also be too high, causing an enterprise to lose the work being sought altogether, and thereby lose revenue. Numerous factors such as brand, processor speed, type of equipment, and system age must be taken into consideration, affecting not only recovery potential, but processing expense. When these factors are coupled with the volatility of prices in the recyclable goods commodity markets, the decision process becomes increasingly difficult. Given a situation where a customer does not have a clear understanding of the internal content of the equipment to be scrapped, generating a profitable, yet competitive price quote becomes even more difficult.

In view of the foregoing, there exists a need for a method, system and program product for generating a demanufacturing price quote that, quickly and with relative accuracy, estimates the costs and recoveries associated with a given heterogeneous lot of electronic equipment.

It is believed, therefore, that a method, system and program product for generating a demanufacturing price quote which provides the many advantages taught herein would obviate many of the problems and limitations described hereinabove, and would constitute a significant advancement in the art.

OBJECTS AND SUMMARY OF THE INVENTION

It is a primary object of the present invention to enhance the art of demanufacturing price quote generation.

It is another object of the invention to provide a method (and system and program product) for generating a demanufacturing price quote which functions in a new and unique manner.

It is yet another object of the invention to provide a method (and system and program product) for generating a demanufacturing price quote that, quickly and with relative accuracy, estimates the costs and recoveries associated with a given lot of electronic equipment.

In accordance with one embodiment of the invention, there is provided a method for generating a demanufacturing price quote comprising providing a list describing at least one piece of equipment, defining at least one representative equipment group, determining and storing at least one default data value in said at least one representative equipment group, categorizing said at least one piece of equipment into said at least one representative equipment group, determining a group quantity of equipment in said at least one representative equipment group, multiplying said group quantity of equipment by said at least one default data value, and calculating a profit or loss for said at least one representative equipment group.

In accordance with one embodiment of the invention, there is provided a method for generating a demanufacturing price quote comprising providing a list describing at least one piece of equipment, defining at least one representative equipment group, determining and storing at least one default data value in the at least one representative equipment group, categorizing the at least one piece of equipment into the at least one representative equipment group, determining a group quantity of equipment in the at least one representative equipment group, multiplying the group quantity of equipment by the at least one default data value, and calculating a profit or loss for the at least one representative equipment group.

In accordance with another embodiment of the invention, there is provided a method for generating a demanufacturing price quote comprising providing a list describing at least one piece of equipment, defining at least one representative equipment group, determining and storing at least one default data value in the at least one representative equipment group, storing at least one study data value in the at least one representative equipment group if the at least one study data value has been determined, categorizing the at least one piece of equipment into said the at least one representative equipment group, determining a group quantity of equipment in the at least one representative equipment group, multiplying the at least one study data value and the group quantity if the at least one study data value exists for the at least one representative equipment group, or multiplying the at least one default data value and the group quantity if the at least one study data value does not exist for the at least one representative equipment group, and calculating a profit or loss for the at least one representative equipment group.

In accordance with yet another embodiment of the invention, there is provided a system for generating a demanufacturing price quote comprising at least one representative equipment group having just default data values, or both default data values and study data values, and a demanufacturing price quote processor adapted to utilize the study data values if the study data values exist for the at least one representative equipment group, or to utilize the default data values if the study data values do not exist for the at least one representative equipment group.

In accordance with yet another embodiment of the invention, there is provided a program product stored on a recordable medium for generating a demanufacturing price quote, which when executed, comprises program code for providing a list describing at least one piece of equipment, program code for defining at least one representative equipment group, program code for determining and storing at least one default data value in the at least one representative equipment group, program code for categorizing the at least one piece of equipment into the at least one representative equipment group, program code for determining a group quantity of equipment in the at least one representative equipment group, program code for multiplying the group quantity of equipment by the at least one default data value, and program code for calculating a profit or loss for the at least one representative equipment group.

In accordance with yet another embodiment of the invention, there is provided a program product stored on a recordable medium for generating a demanufacturing price quote, which when executed, comprises program code for providing a list describing at least one piece of equipment, program code for defining at least one representative equipment group, program code for determining and storing at least one default data value in the at least one representative equipment group, program code for storing at least one study data value in the at least one representative equipment group if the at least one study data value has been determined, program code for categorizing said the at least one piece of equipment into the at least one representative equipment group, program code for determining a group quantity of equipment in the at least one representative equipment group, program code for multiplying the at least one study data value and the group quantity if the at least one study data value exists for the at least one representative equipment group, or multiplying the at least one default data value and the group quantity if the at least one study data value does not exist for the at least one representative equipment group, and program code for calculating a profit or loss for the at least one representative equipment group.

BRIEF DESCRIPTION OF THE DRAWINGS

The above and other objects, features and advantages of the present invention will be better understood by reading the following more particular description of the invention in conjunction with the accompanying drawings wherein.

Figure 1:
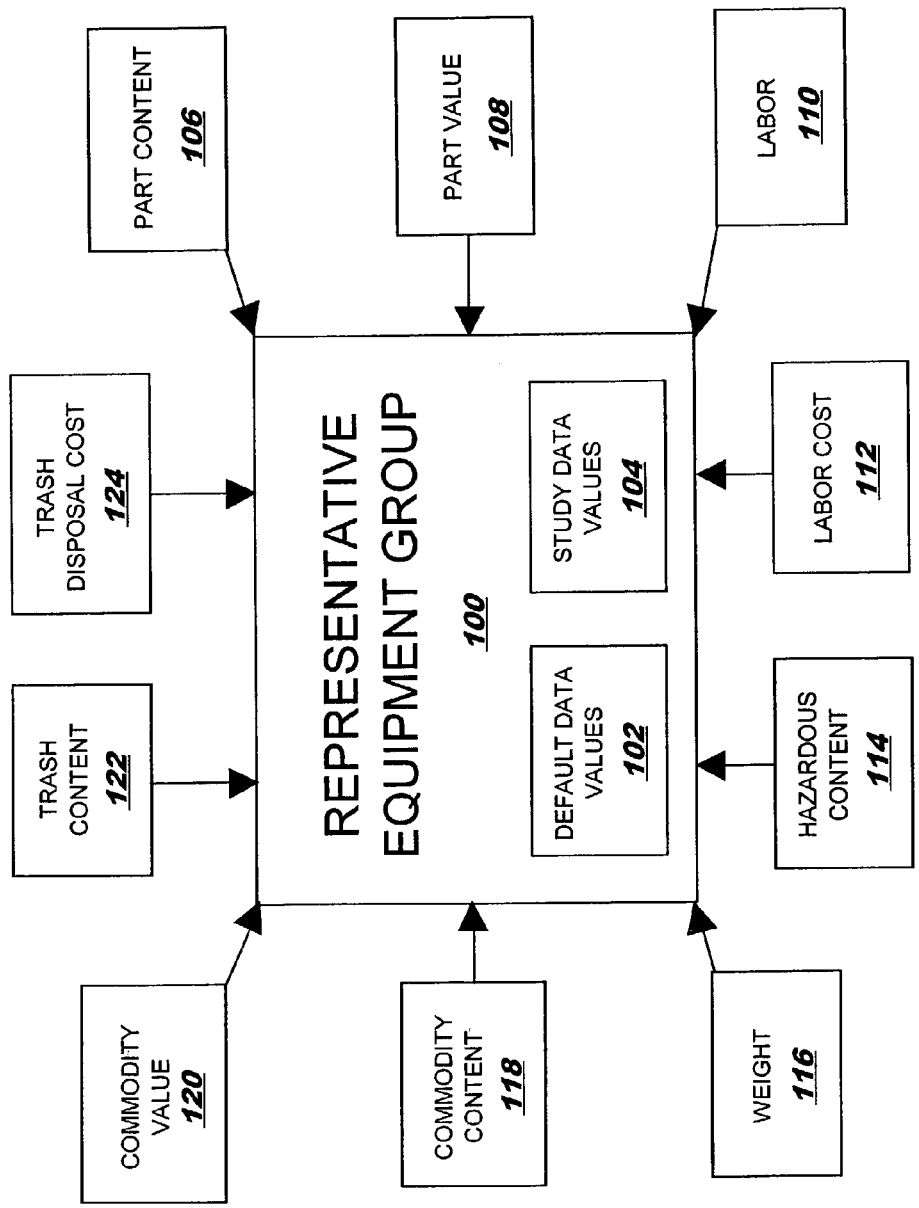
FIG. 1 is a schematic view illustrating representative equipment group data according to one embodiment of the invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

As indicated above, the present invention provides a method, system and program product for generating a demanufacturing price quote. Specifically, the present invention allows price quotes to be generated, quickly and with relative accuracy, for the processing of end-of-life electronic equipment that is to be dismantled, recycled or otherwise disposed of, by estimating the costs and recoveries associated with processing a given lot of electronic equipment.

Referring to FIG. 1, there is shown an embodiment of representative equipment group 100. When a demanufacturing enterprise receives or develops a list of equipment describing the contents of a given lot of equipment for which a demanufacturing price quote is requested, a plurality of instances of representative equipment group 100 are defined, and the equipment listed as being contained in this lot of equipment is respectively categorized into appropriate instances of representative equipment group 100.

Some exemplary instances of equipment group 100 are described hereinbelow. For Desktop PCs, instances of representative equipment group 100 may comprise: CPU only—Old, CPU only—New, Complete System—Old, and Complete System—New. For Laptops, instances of representative equipment group 100 may comprise: Laptop—Old and Laptop—New. For Intermediate Systems, instances of representative equipment group 100 may comprise: Small Server, Medium Rack Mounted, and Large Rack Mounted. For Large Systems, instances of representative equipment group 100 may comprise: DASD and Mainframes. For Monitors, instances of representative equipment group 100 may comprise: Monitor Old—Small, Monitor Old—Medium, Monitor Old—Large, Monitor Late Model—Small, Monitor Late Model—Medium, Monitor Late Model—Large, Terminals, and Flatscreen. For Printers, instances of representative equipment group 100 may comprise: Printer—Dot Matrix, Printer—Inkjet, Printer—Greenbar, Printer—Laser, Printer—Network, Printer—Mainframe, Plotter—Personal, and Plotter—Business. For Point of Sale Systems, instances of representative equipment group 100 may comprise: Point of Sale System—Monitor Separate, Point of Sale System—CRT Type Monitor, Point of Sale System—Printer, Point of Sale System—Monitor and Printer. Other miscellaneous instances of representative equipment group 100 may comprise: Keyboard, Scanner, FAX Machine, Copier—Tabletop, Copier—Freestanding, Docking Station, Hubs, Switches, Modems, Telephones, and Uninterruptible Power Supply (UPS).

These instances of representative equipment group 100, described hereinabove by way of example, are not intended to portray an exhaustive list, and as many additional instances of equipment group 100 as there are known types of electronic equipment may be defined.

For each instance of representative equipment group 100 that is defined, a plurality of data values relevant to the instance are determined and stored in the instance. If data values are determined based upon the personal knowledge or experience of an agent of a demanufacturing enterprise, or another person with relevant knowledge or experience in the field of demanufacturing, these data values are stored as default data values 102. Alternatively, if data values are determined based upon a dismantle study of a piece of equipment that is typical, and representative of, a given instance of equipment group 100, these data values are stored as study data values 104. A dismantle study is an investigation wherein an experienced demanufacturing worker, or workers, dismantle a piece of equipment, and a record is kept of data values related to the piece of equipment. If a plurality of dismantle studies for a given instance of equipment group 100 are available, respective data values of the plurality of studies may be averaged, providing an improvement in the representativeness of the data values as compared to a single study.

Examples of data values that may be stored in an instance of representative equipment group 100 as default data values 102 and study data values 104 are described with reference to FIG. 1 hereinbelow.

Part content 106 comprises data as to whether an instance of representative equipment group 100 contains reusable parts that may be removed and sold, as well as the type and quantity of these parts. It is generally preferred that a part be sold rather than shredded and recycled, as selling a part generally provides a greater financial return, and reduces disposal costs that would otherwise be incurred. Part value 108 comprises data as to the market value of the parts of part content 106. Part value 108 may be expressed in units of monetary value per part, in one example dollars per part.

Labor 110 comprises data regarding amounts of time respectively utilized to perform tasks related to demanufacturing an instance of representative equipment group 100. Labor 110 tasks may comprise transportation, receipt, inventory, handling, limited dismantle, dismantle, shred, module sales, part sales, machines sales, and other. Labor 110 may be expressed in units of time, for example in hours or minutes. Labor Cost 112 comprises data regarding labor rates for performing the tasks of labor 110. A single labor rate may be utilized for all the tasks of labor 110, different rates may be respectively utilized for different categories of labor of labor 110 (e.g. one rate may be utilized for dismantle tasks, and another may be utilized for sales tasks), or different rates may be respectively utilized for all the tasks of labor 110. Labor rates may be determined during periodic financial planning cycles of demanufacturing enterprises. Labor cost 112 may be expressed in units of monetary value per units of time, in one example dollars per hour.

Hazardous content 114 comprises data as to whether an instance of representative equipment group 100 contains hazardous material. If hazardous material, in one example Poly-Chlorinated Biphenyls (also known as "PCBs"), are contained within an instance of equipment group 100, special handling, and therefore additional labor costs, may be required to ensure the safety of demanufacturing workers, or to comply with government regulations. Also, significant hazardous material disposal costs may ensue.

Weight 116 comprises data as to the weight of an instance of representative equipment group 100. This data may be utilized to estimate labor comprising transportation, receipt, inventory, and handling, as well as commodity content and trash content which are described hereinbelow. Weight 116 may be expressed in units of weight, for example pounds or kilograms.

Commodity content 118 comprises data as to whether an instance of representative equipment group 100 contains commodities that may be removed and sold, as well as the types and amounts of these commodities. Commodity content 118 types may comprise steel, aluminum—high, aluminum—mixed, copper—high, copper—mixed, copper—foil, copper—trim, silver —wire, gold—high, gold—mixed, gold—ends, platinum—high, platinum—mixed, plastic, softfoam, glass, paper, cardboard, and other. Commodity content 118 types may also comprise components, or even an entire piece of equipment, that are sold as commodities rather than reusable parts. Commodity content 118 types may therefore further comprise a complete piece of equipment, keyboards, disk drives, blowers, fans, pumps, hoses, and wire. Commodity content 118 amounts may comprise respective percentages, by weight, of given commodity content 118 types contained in the instance of equipment group 100. A total quantity of a given commodity content 118 type may therefore be estimated using a respective commodity content 118 amount and weight data from weight 116. Commodity value 120 comprises data as to the market value of the commodities of commodity content 118. Commodity value 120 data may be obtained from sources comprising quotes from recycling and smelting enterprises, Internet websites such as the "RecycleNet Composite Index—Online Market Prices" website, and previous commodity sales. Commodity value 120 may be expressed in units of monetary value per units of weight, in one example dollars per pound.

Trash content 122 comprises data as to whether an instance of representative equipment group 100 contains trash which may not currently be sold or recycled, and which should therefore be removed and disposed of in an environmentally safe manner. Trash content 122 may further comprise data as to percentage of trash, by weight, in the instance of equipment group 100. A total quantity of trash in the instance of equipment group 100 may therefore be estimated using percentage of trash data, by weight, from trash content 122 and weight data from weight 116. Trash disposal cost 124 comprises data as to the cost to dispose of the trash of trash content 122, for example hauling costs and landfill fees, in an environmentally safe manner. Trash disposal cost 124 may be expressed in units of monetary value per units of weight, in one example dollars per pound.

Figure 2:
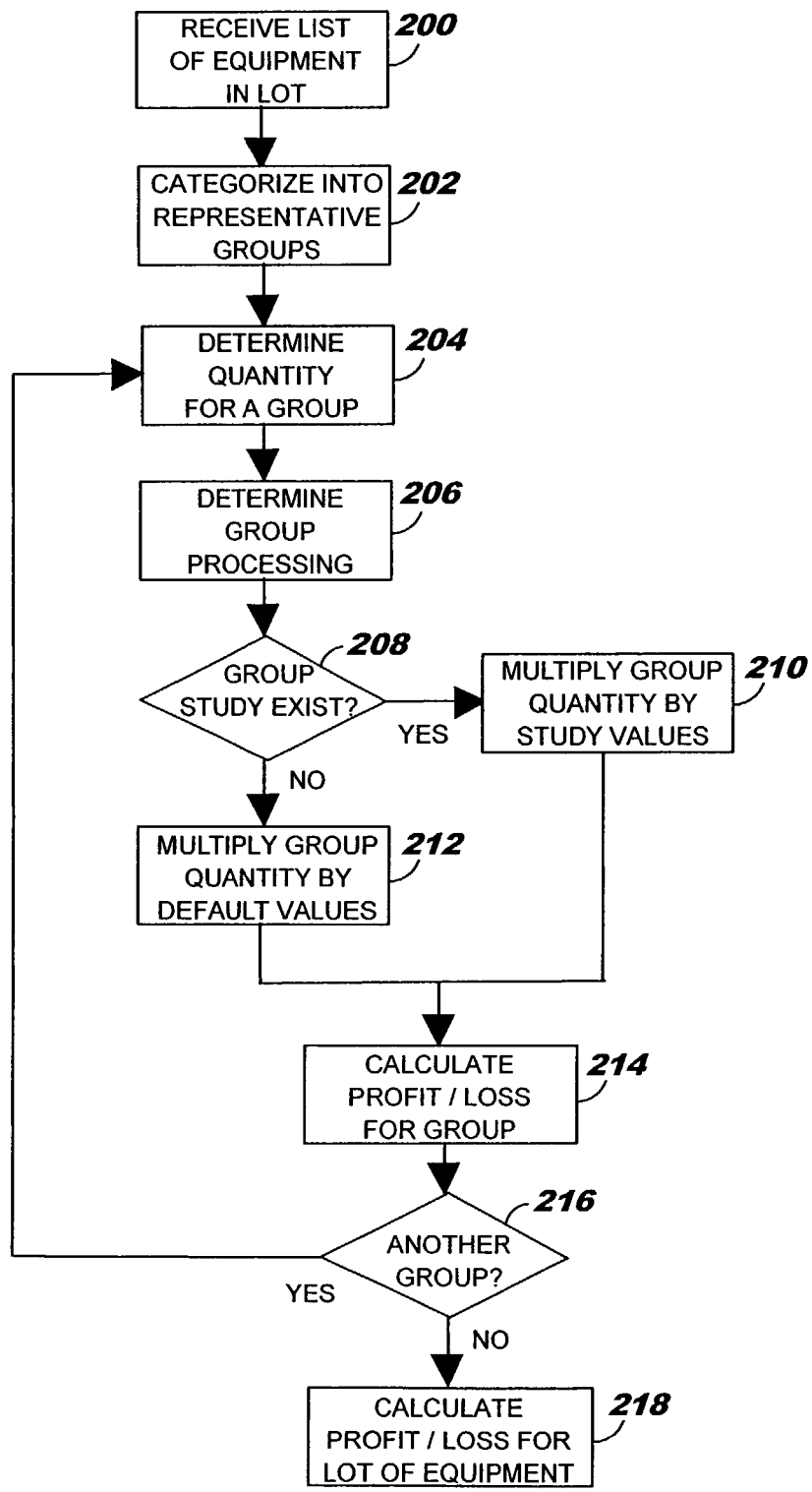
FIG. 2 is a flow diagram illustrating a process for generating a price quote according to one embodiment of the invention.

Referring now to the flow diagram of FIG. 2, method steps according to an embodiment of the present invention are shown.

A list of equipment in a given lot of equipment to be demanufactured is received or developed in step 200. The equipment in this lot of equipment is respectively categorized into appropriate instances of representative equipment group 100 in step 202.

The quantity of equipment in an instance of representative equipment group 100 (hereinafter referred to as "group quantity") is determined in step 204 by computing the total number of pieces of equipment in the instance of group 100. Processing for equipment in the instance of equipment group 100 is determined in step 206. This may comprise selling the equipment outright if a market for the equipment exists, removing parts from the equipment if resalable parts are contained therein, separating out and selling commodity content, separating out and sending trash content to a landfill, or any combination thereof.

In step 208, a determination is made as to whether or not study data values 104 exist for the instance of representative equipment group 100. If study data values 104 do exist for the instance of group 100, in step 210 study data values 104 are utilized and multiplied by the group quantity computed in step 204. If study data values 104 do not exist for the instance of group 100, in step 212 default data values 102 are utilized and multiplied by the group quantity computed in step 204.

Profit/Loss for the instance of equipment group 100 is calculated in step 214 by adding all of the recoveries from outright sales of intact equipment, sales of parts and commodity content, and subtracting labor costs, transportation costs, hazardous material disposal costs, trash disposal costs, and other costs.

In step 216, a determination is made as to whether or not there is another instance of representative equipment group 100 into which equipment was categorized in step 202, and which has not yet been processed. If there is another instance of equipment group 100 which has not yet been processed, group quantity for this instance of equipment group 100 is determined in step 204. If there are no more instances of equipment group 100 to be processed, profit/loss for all instances of equipment group 100 is calculated in step 218 by adding together the profit/loss for each instance of representative equipment group 100 into which equipment was categorized in step 202.

Figure 3:
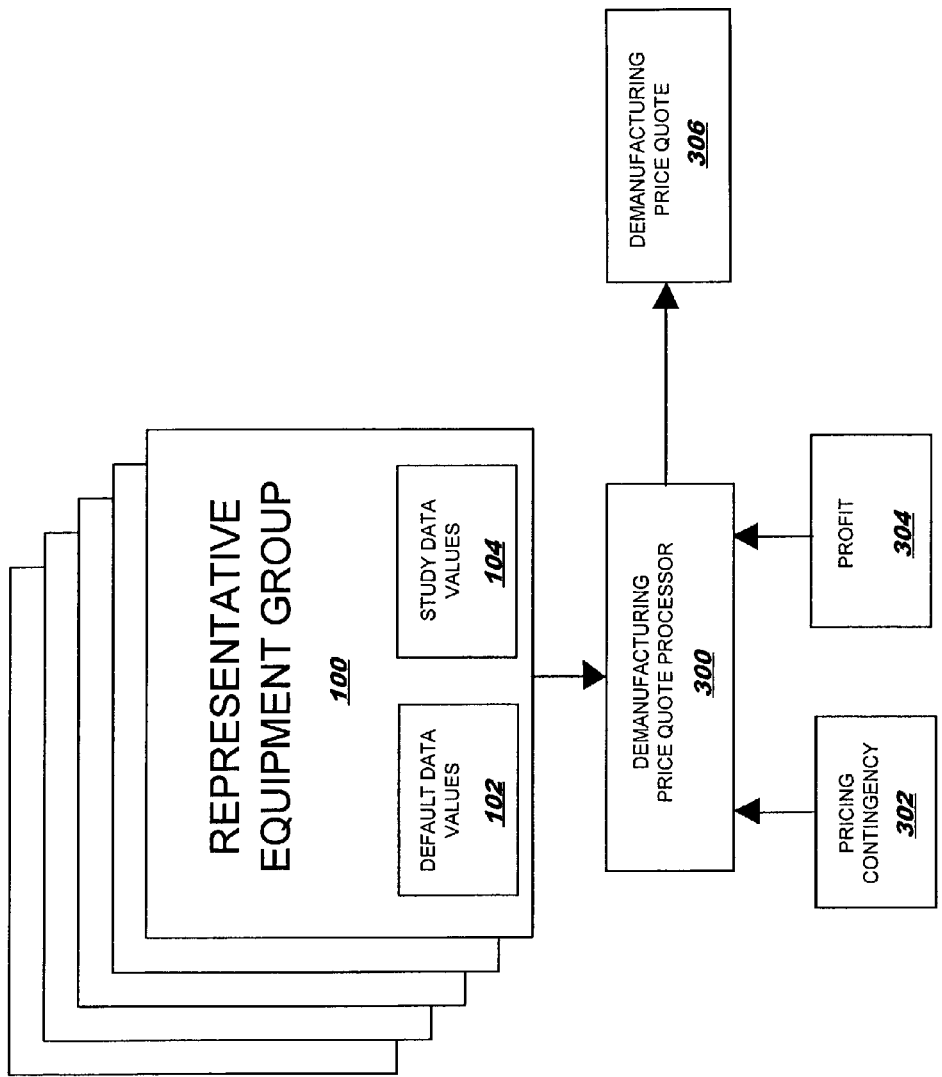
FIG. 3 is a schematic view illustrating a system for generating a price quote according to one embodiment of the invention.

Referring now to FIG. 3, a plurality of instances of representative equipment group 100 are shown, each having respective instances of default data values 102 and study data values 104. Although five instances of equipment group 100 are shown in FIG. 3, by way of example, as many instances of representative equipment group 100 as there are known types of electronic equipment may be defined.

Demanufacturing price quote processor 300 calculates a profit/loss for processing a given lot of equipment according to the method steps described hereinabove with reference to FIG. 2.

In one example, demanufacturing price quote processor 300 may be a spreadsheet program running on a personal computer or workstation, however processor 300 may be any type of hardware, software, or a combination of hardware and software. Any kind of computer/server system(s), or other apparatus, such as special purpose hardware or a circuit module, adapted for carrying out the methods described herein, is suited.

Demanufacturing price quote processor 300 incorporates pricing contingency 302 into the profit/loss for processing the lot of equipment which may serve to reduce financial risk associated with the price quote being generated. If processor 300 has calculated a profit, the profit is reduced by a pre-determined amount, in one example 20%. If processor 300 has calculated a loss, the loss is increased by a pre-determined amount, in one example 20%.

Demanufacturing price quote processor 300 also incorporates profit 304 into the profit/loss for processing the lot of equipment to produce demanufacturing price quote 306. Incorporating profit 304 into price quote 306 may serve to further reduce financial risk associated with price quote 306.

As indicated hereinabove, it should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While there have been shown and described what are at present the preferred embodiments of the invention, it will be obvious to those skilled in the art that various changes and modifications may be made therein without departing from the scope of the invention as defined by the appended claims.

What is claimed is:

1. A computer implemented method for generating a price quote for demanufacturing and disposing of a given lot of end-of-life electronic equipment in an environmentally safe manner, said method comprising:
   obtaining, by a demanufacturing price quote processor, one or more data values describing at least one piece of dismantled electronic equipment;
   receiving, by the demanufacturing price quote processor, one or more dismantle study data values relating to the obtained one or more data values, said one or more dismantle study data values comprising at least one dismantle study data value having a monetary value;
   storing, by the demanufacturing price quote processor, the one or more dismantle study data values in each representative equipment group of a plurality of representative equipment groups of electronic equipment;
   computing, by the demanufacturing price quote processor, a respective group quantity of electronic equipment in each representative equipment group;
   computing, by the demanufacturing price quote processor, at least one product by multiplying each dismantle study data value of the at least one dismantle study data value by the respective group quantity;
   calculating, by the demanufacturing price quote processor, a profit or loss for each representative equipment group in dependence on the computed at least one product;
   calculating, by the demanufacturing price quote processor, a net profit or loss by adding together the calculated profit or loss of the representative equipment groups of the plurality of representative equipment groups;
   ascertaining, by the demanufacturing price quote processor, that the calculated net profit or loss is a net loss;
   adjusting, by the demanufacturing price quote processor, the net profit or loss by increasing the net loss by a specified pricing contingency factor; and
   determining, by the demanufacturing price quote processor, the price quote using the adjusted net profit or loss;
   wherein the demanufacturing price quote processor comprises a computer hardware processor.

2. The method of claim 1,
   wherein for each representative equipment group, the one or more dismantle study data values are selected from the group consisting of part content data identifying a quantity of reusable parts, part value data expressed in monetary units per said reusable part, labor data comprising times for performing labor tasks related to dismantling the electronic equipment, labor cost data expressed in monetary units per unit time for performing said labor tasks, weight data of weight of electronic equipment, commodity content data of amount and weight of commodities, commodity value data expressed in monetary units of said commodities per unit weight, and combinations thereof.

3. The method of claim 2,
   wherein for each representative equipment group, the one or more dismantle study data values comprise the part content data, the part value data, the labor data, the labor cost data, the commodity content data, and the commodity value data.

4. The method of claim 3, wherein for each representative equipment group, the one or more dismantle study data values further comprise the weight data.

5. The method of claim 1, wherein the demanufacturing price quote processor performs the method by executing a spreadsheet program running on a personal computer system.

6. The method of claim 1, wherein the at least one piece of dismantled electronic equipment comprises computer equipment.

7. The method of claim 1, wherein the plurality of representative equipment groups are selected from the group consisting of Desktop PC, CPU only—Old, CPU only—New, Complete System—Old, Complete System—New, Laptop—Old, Laptop—New, Small Server, Medium Rack Mounted Server, Large Rack Mounted Server, DASD, Mainframes, Monitor Old—Small, Monitor Old—Medium, Monitor Old—Large, Monitor Late Model—Small, Monitor Late Model—Medium, Monitor Late Model—Large, Terminals, Flatscreens, Printer—Dot Matrix, Printer—Inkjet, Printer—Greenbar, Printer—Laser, Printer—Network, Printer—Mainframe, Plotter —Personal, Plotter—Business, Point of Sale System—Monitor Separate, Point of Sale System—CRT Type Monitor, Point of Sale System—Printer, Point of Sale System—Monitor and Printer, Keyboard, Scanner, FAX Machine, Copier—Tabletop, Copier—Freestanding, Docking Station, Hubs, Switches, Modems, Telephones, Uninterruptible Power Supply (UPS), and combinations thereof.

8. The method of claim 1, wherein the specified pricing contingency factor is 20%.

9. A computer implemented method for generating a price quote for demanufacturing and disposing of a given lot of end-of-life electronic equipment in an environmentally safe manner, said method comprising:
receiving, by a demanufacturing price quote processor, one or more default data values, said one or more default data values comprising at least one default data value having a monetary value;
storing, by the demanufacturing price quote processor, the one or more default data values in each representative equipment group of a plurality of representative equipment groups of electronic equipment;
computing, by the demanufacturing price quote processor, a respective group quantity of electronic equipment in each representative equipment group;
computing, by the demanufacturing price quote processor, at least one product by multiplying each default data value of the at least one default data value by the respective group quantity;
calculating, by the demanufacturing price quote processor, a profit or loss for each representative equipment group in dependence on the computed at least one product;
calculating, by the demanufacturing price quote processor, a net profit or loss by adding together the calculated profit or loss of the representative equipment groups of the plurality of representative equipment groups;
ascertaining, by the demanufacturing price quote processor, that the calculated net profit or loss is a net loss;
adjusting, by the demanufacturing price quote processor, the net profit or loss by increasing the net loss by a specified pricing contingency factor; and
determining, by the demanufacturing price quote processor, the price quote using the adjusted net profit or loss;
wherein the demanufacturing price quote processor comprises a computer hardware processor.

10. The method of claim 9,
wherein for each representative equipment group, the one or more default data values are selected from the group consisting of part content data identifying a quantity of reusable parts, part value data expressed in monetary units per said reusable part, labor data comprising times for performing labor tasks related to dismantling the electronic equipment, labor cost data expressed in monetary units per unit time for performing said labor tasks, weight data of weight of electronic equipment, commodity content data of amount and weight of commodities, commodity value data expressed in monetary units of said commodities per unit weight, and combinations thereof.

11. The method of claim 10,
wherein for each representative equipment group, the one or more default data values comprise the part content data, the part value data, the labor data, the labor cost data, the commodity content data, and the commodity value data.

12. The method of claim 11, wherein for each representative equipment group, the one or more default data values further comprise the weight data.

13. The method of claim 9, wherein the demanufacturing price quote processor performs the method by executing a spreadsheet program running on a personal computer system.

14. The method of claim 9, wherein the at least one piece of dismantled electronic equipment comprises computer equipment.

15. The method of claim 9, wherein the plurality of representative equipment groups are selected from the group consisting of Desktop PC, CPU only—Old, CPU only—New, Complete System—Old, Complete System—New, Laptop—Old, Laptop—New, Small Server, Medium Rack Mounted Server, Large Rack Mounted Server, DASD, Mainframes, Monitor Old—Small, Monitor Old—Medium, Monitor Old—Large, Monitor Late Model—Small, Monitor Late Model—Medium, Monitor Late Model—Large, Terminals, Flatscreens, Printer—Dot Matrix, Printer—Inkjet, Printer—Greenbar, Printer—Laser, Printer—Network, Printer—Mainframe, Plotter—Personal, Plotter—Business, Point of Sale System—Monitor Separate, Point of Sale System—CRT Type Monitor, Point of Sale System—Printer, Point of Sale System—Monitor and Printer, Keyboard, Scanner, FAX Machine, Copier—Tabletop, Copier—Freestanding, Docking Station, Hubs, Switches, Modems, Telephones, Uninterruptible Power Supply (UPS), and combinations thereof.

16. The method of claim 9, wherein the specified pricing contingency factor is 20%.

* * * * *